J. N. VANDEGRIFT.
ANTIFRICTION BEARING FOR AXLES.
APPLICATION FILED APR. 7, 1911.

1,215,749.

Patented Feb. 13, 1917.
2 SHEETS—SHEET 1.

WITNESSES:
Chas. H. Young.
S. Davis.

INVENTOR
James N. Vandegrift
BY
Parsons Hall & Bodell
ATTORNEYS

J. N. VANDEGRIFT.
ANTIFRICTION BEARING FOR AXLES.
APPLICATION FILED APR. 7, 1911.
1,215,749.
Patented Feb. 13, 1917.
2 SHEETS—SHEET 2.
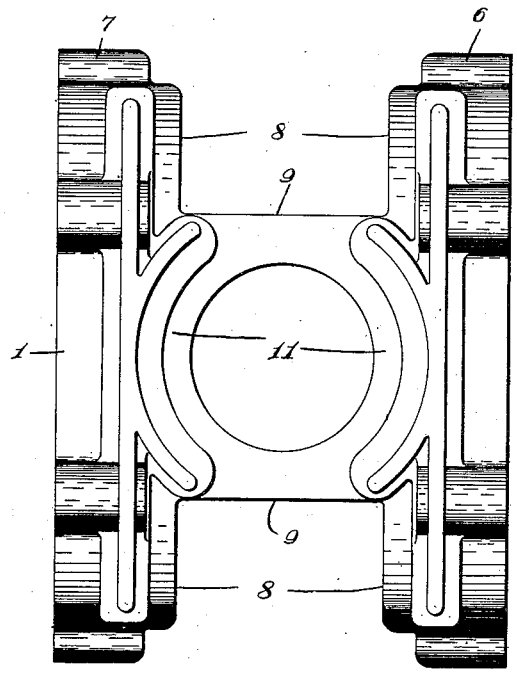
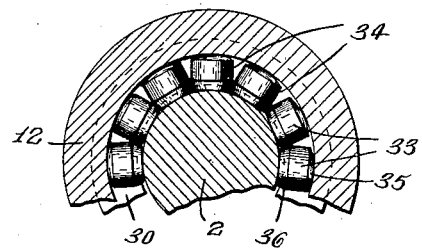
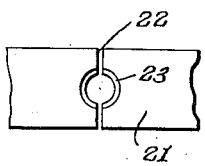
WITNESSES:
INVENTOR
James N. Vandegrift
BY
Parsons Hagu Bodell
ATTORNEYS

UNITED STATES PATENT OFFICE.

JAMES N. VANDEGRIFT, OF SYRACUSE, NEW YORK.

ANTIFRICTION-BEARING FOR AXLES.

1,215,749.  Specification of Letters Patent.  Patented Feb. 13, 1917.

Application filed April 7, 1911. Serial No. 619,496.

*To all whom it may concern:*

Be it known that I, JAMES N. VANDEGRIFT, of Syracuse, in the county of Onondaga and State of New York, have invented a certain new and useful Antifriction-Bearing for Axles, of which the following is a specification.

This invention has for its object the production of an antifriction bearing for axles, which is particularly simple in construction and highly efficient and durable in use; and the invention consists in the combinations and constructions hereinafter set forth and claimed.

In describing this invention reference is had to the accompanying drawing in which like characters designate corresponding parts in all the views.

Fig. 3 is a plan view of the box.

Fig. 4 is a sectional view on line "A—A", Fig. 1.

Fig. 5 is a fragmentary view of a portion of one of the bearing rings.

1 is a journal box provided with an opening for the axle 2 and with raceways 3 spaced apart from each other and formed with opposing flat side surfaces disposed at right angles to the axis of the bearing, the raceways being preferably substantially cylindrical and of greater diameter than the intervening portion of the axle opening.

Figure 2:
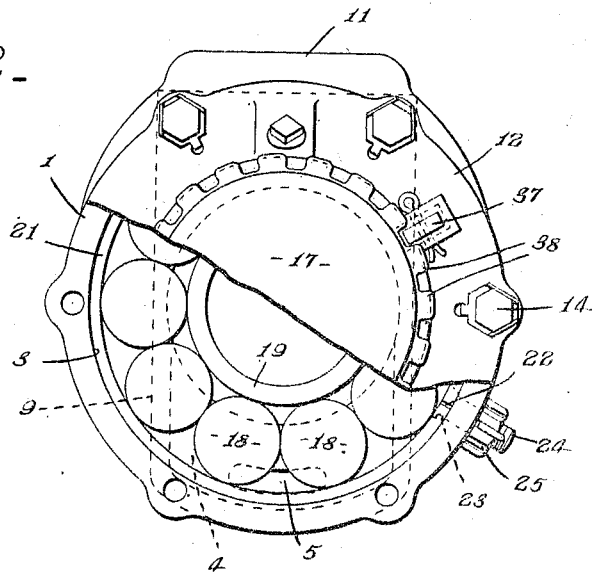
Fig. 2 is an end elevation, partly broken away, looking to the right, Fig. 1.

4 is an oil reservoir indicated in dotted lines Fig. 2, the same being located in the lower portion of the box, opposite side walls thereof forming the inner end walls of the lower portions of the raceways 3; said side walls being formed with arcuate slots 5, Fig. 2, for permitting the oil to run into the raceways.

In the illustrated construction of this bearing, the journal box is provided with external projecting end portions 6, 7 in which the raceways are formed, and also with external vertical channels 8 on opposite sides thereof, the channels extending between the projecting portions 6, 7 and being provided with substantially upright bottoms 9.

The channels 8 receive the jaws 10 of a truck frame and permit relative movement of the truck frame vertically relatively to the box, and the flat bottoms 9 of the channels prevent turning of the box with the axle 2.

The box is also provided with a socket 11 on its upper side in which is seated the spring which is usually interposed between the truck frame and the journal box.

The distance between the channels 8 is usually less than the diameter of the raceways 3, in order that the box may be of minimum size and be adapted to the jaws of ordinary truck frames and yet be provided with raceways of sufficient size to accommodate antifriction members of relatively large diameter.

It is apparent however that the journal box may be provided with any suitable means arranged between the planes of the raceways, or otherwise, for engaging the truck frame.

Preferably the journal box is also provided with detachable end walls 12 and 13 secured to the body of the box in any suitable manner as by cap screws 14. These end walls 12 and 13 form the outer sides of the raceways 3 and the inner faces thereof are usually arranged normal, that is in planes at a right angle, to the axis of the box 1, and parallel to the opposing side of the channel 8. The inner end wall 13 is provided with suitable means as a packing ring 15 for preventing the entrance of dust into the box and also the exit of oil out of the box, the ring being held in position by a suitable clamping sleeve 16. The outer end wall 12 is also provided with an opening for an extension of the axle to be described, and also carries a suitable cap 17 threading into said wall 12 and having its internal diameter as great as that of the axle opening of the box.

The end wall 12 and cap 17 inclose means located at the outer end of the box for receiving the end thrust of the axle 2, said means being accessible upon the removal of the cap 17 as hereinafter described.

Figure 1:
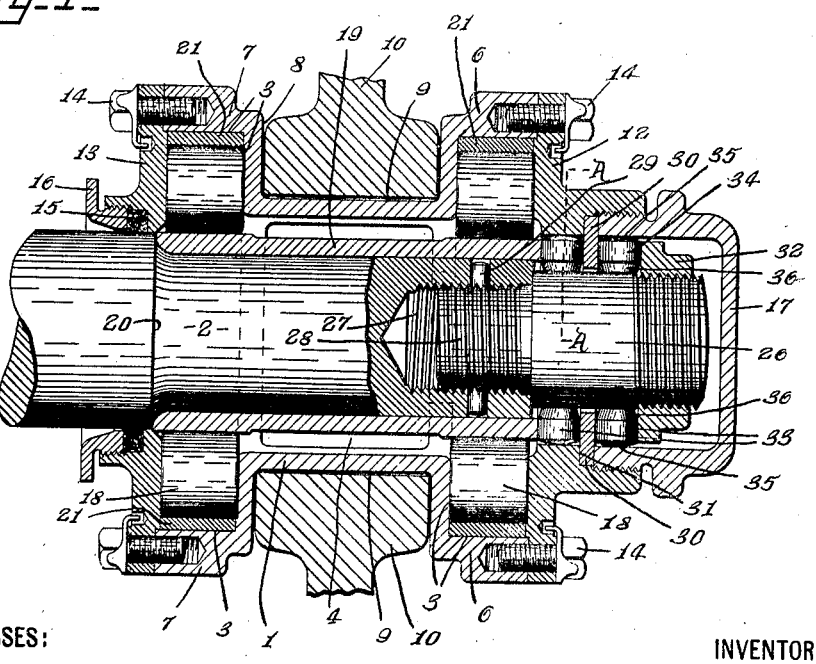
Figure 1 is a horizontal sectional view, partly in elevation, of this bearing, contiguous portions of the axle and truck frame being also shown.

As seen in Figs. 1 and 2, each raceway 3 contains an annular series of rollers 18 rolling in direct contact with each other and arranged with their axes parallel with the axis of the bearing, each roller having flat end faces disposed in planes normal to the axis of the roller and engaging in opposite flat sides or surfaces of the raceways, and each roller is formed of short length compared with its diameter and is preferably of less length than its diameter, so that by reason of the engagement of the flat ends of the rollers with the flat sides of the raceways, said rollers are easily held in alinement and prevented, without the use of any device, from twisting and becoming jammed.

Moreover, by constructing and arranging the raceways and rollers and the external channels as described, the bearing is readily adapted to standard truck frames without modification or change of such truck frames and at the same time rollers of such size can be employed to carry the weight without overloading and crushing the rollers.

Usually the axle 2 is inclosed by a sleeve 19 which abuts at its inner end against a shoulder 20 on the axle, said sleeve 19 extending into the raceways into a position in which its end portions are opposed to the cylindrical walls thereof so that the rollers 18 roll on the end portions of the sleeve.

Preferably, each raceway is provided with a bearing ring 21 of hard steel, said ring being shown as split transversely at 22, Figs. 2 and 5, and provided with beveled edges 23, Fig. 5. Such ring is expanded in order to be clamped tightly in the raceway by means of an expander 24, Fig. 2, having a cam face for engaging the beveled edges 23 and spreading the ring. Said expander 24 extends through the peripheral wall of the raceway and a nut 25 turns on the outer threaded end thereof for drawing said member endwisely and expanding the ring.

The means for receiving the end thrust of the axle 2 is located at the outer end of the box and is constructed to receive the end thrust in opposite directions, and as here illustrated, said thrust bearing coacts with an extension 26 of the axle.

In the illustrated embodiment of my invention, the extension 26 is detachably connected to the axle 2, and one of said detachably connected parts, preferably the axle, is formed with an axial threaded socket 27 which receives a threaded stud 28 projecting from the extension 26. The extension 26 is held from turning movement by a key 29 extending transversely through the axle and stud 28.

The thrust bearing comprises, generally, an abutment ring 30 carried by the outer end wall 12 of the box and encircling the extension 26, annular shoulders associated respectively with the axle 2 and the extension 26 and located on opposite sides of the abutment ring 30, and annular series of antifriction members located on opposite sides of the abutment ring and interposed between opposite faces thereof and said shoulders respectively.

The abutment ring 30 is detachably supported by the outer end wall 12 of the box and is clamped between the end edge of the cap 17 and an annular shoulder 31 on the wall 12 facing said edge face.

The annular shoulder associated with the axle 2 and located on one side of the abutment ring is usually the outer end edge face of the sleeve 19, and the annular shoulder associated with the extension 26 is the inner face of a nut 32 turning on the end of said extension 26.

The antifriction members 33 interposed between opposite faces of the abutment ring 30 and respectively the shoulders on the nut 32 and sleeve 19 may be of any desirable form, and in the illustrated embodiment of my invention each antifriction member 33 is here shown as provided with a cylindrical face 34 for engaging the abutment ring and said shoulders, a spherical outer end face 35 for engaging the circumferential wall of the raceway in which such roller works, and a conical peripheral surface 36 at its inner end, the conical surface 36 engaging the conical surfaces of the next members 33. Obviously upon the removal of the cap 17 the parts of the thrust bearing are readily accessible.

This cap 17 is normally held from turning by a locking device 37 coacting with a serrated peripheral flange 38 on said cap 17.

My antifriction bearing is particularly advantageous in that it is comparatively small and compactly arranged and yet the rollers in the raceways are of ample size, and are confined to a purely radial action by a compact thrust bearing taking the thrust in opposite directions, and owing to the relative size and form of the rollers, the rollers cannot be crushed or become jammed.

What I claim is:—

1. The combination with an axle, a journal box inclosing the axle, the outer end portion of the axle extending beyond the outer end of the sleeve, a thrust bearing, around the extension of the axle to take the thrust in opposite directions including antifriction members engaging directly with the end of the sleeve, substantially as and for the purpose described.

2. The combination with an axle having an extension at its end detachably secured thereto of less diameter than the normal diameter of the axle, a journal box inclosing the axle, a sleeve mounted on the axle, the extension of the axle extending beyond the end of the sleeve and the sleeve at its outer end extending slightly beyond the end of the larger portion of the axle and slightly overhanging the extension, an annular abutment fixed to the box and being opposed to and spaced apart from the outer end of the sleeve, an annular shoulder at the outer end of the extension and spaced apart from the abutment, anti-friction members between the abutment and the end face of the sleeve and being disengaged from the end face of the larger portion of the axle, and anti-friction members interposed between the abutment and the annular shoulder.

3. The combination with an axle having an extension at its end, of less diameter than the normal diameter of the axle, a journal box inclosing the axle, a sleeve mounted on the axle, the extension of the axle extending beyond the end of the sleeve and the sleeve at its outer end extending slightly beyond the end of the larger portion of the axle and slightly overhanging the extension, an annular abutment fixed to the box and being opposed to and spaced apart from the outer end of the sleeve, an annular shoulder at the outer end of the extension and spaced apart from the abutment, anti-friction members between the abutment and the end face of the sleeve and being disengaged from the end face of the larger portion of the axle, and anti-friction members interposed between the arms and the annular shoulders.

In testimony whereof, I have hereunto signed my name, in the presence of two attesting witnesses, at Syracuse, in the county of Onondaga, in the State of New York, this 3rd day of April, 1911.

JAMES N. VANDEGRIFT.

Witnesses:
L. DAVIS,
S. DAVIS.